(12) United States Patent  
Tenberge

(10) Patent No.: US 7,819,772 B2  
(45) Date of Patent: Oct. 26, 2010

(54) POWERSHIFTABLE MULTISTAGE TRANSMISSION

(75) Inventor: Peter Tenberge, Chemnitz/Einsiedel (DE)

(73) Assignee: EGS Entwicklungsgesellschaft fuer Getriebesysteme mbH, Chemnitz/Eisiedel (DE)

( * ) Notice: Subject to any disclaimer, the term of this patent is extended or adjusted under 35 U.S.C. 154(b) by 0 days.

(21) Appl. No.: 12/565,174

(22) Filed: Sep. 23, 2009

(65) Prior Publication Data

US 2010/0029433 A1    Feb. 4, 2010

Related U.S. Application Data

(63) Continuation of application No. PCT/DE2008/000481, filed on Mar. 19, 2008.

(30) Foreign Application Priority Data

Mar. 23, 2007    (DE) ........................ 10 2007 014 150

(51) Int. Cl.  
*F16H 3/62* (2006.01)
(52) U.S. Cl. ...................... 475/275; 475/284
(58) Field of Classification Search .................. 475/284, 475/275, 207, 219
See application file for complete search history.

(56) References Cited

U.S. PATENT DOCUMENTS

| | | | |
|---|---|---|---|
| 5,167,592 A | 12/1992 | Sakamoto | |
| 2003/0100395 A1 | 5/2003 | Haraiwi | |
| 2006/0142111 A1 | 6/2006 | Park | |
| 2006/0266144 A1 | 11/2006 | Schafer et al. | |
| 2009/0082167 A1* | 3/2009 | Wittkopp et al. | ............ 475/311 |

FOREIGN PATENT DOCUMENTS

DE    10 2004 001 278 A1    8/2005

(Continued)

OTHER PUBLICATIONS

International Search Report dated Aug. 1, 2008 with English translation of relevant portion.

(Continued)

*Primary Examiner*—David D Le  
*Assistant Examiner*—Erin D Bishop  
(74) *Attorney, Agent, or Firm*—Crowell & Moring LLP

(57) ABSTRACT

A powershiftable multistage transmission (LMG) between an input shaft (an), which can be connected to a first transmission shaft (1), and an output shaft (ab=2) as a second transmission shaft, comprising two shaft-lines (WS1 and WS2) which are arranged in parallel in a transmission housing (0), three transfer gears (SG) between these shaft-lines, three planetary gears (PG) each with a sun gear (So), a ring gear (Ho) and a planet-carrier (Pt) with single planets, and a plurality, preferably five, shifting elements (SE). With only five shifting elements eight forward gears and one reverse gear can be switched. The six gear elements have ratios which can be designed easily even if the total ratio range is somewhere between $7 < \phi_{ges} < 9$. Due to the distribution of the gear elements on two shaft-lines, the transmission gearbox has a short length and is suitable for front-cross-applications as well as inline-applications. All shifting elements can be easily fed with oil to control them. With only four shifting elements the transmission still has five well stepped forward gears and one reverse gear. The gear-trains 47 and 58 are very suitable gear elements to link to an electric motor to obtain an advantageous hybrid driveline.

14 Claims, 14 Drawing Sheets

FOREIGN PATENT DOCUMENTS

| | | |
|---|---|---|
| DE | 10 2005 018 804 | 7/2006 |
| DE | 10 2005 002 337 | 8/2006 |
| EP | 0 094 464 A | 11/1983 |
| JP | 2000-304110 A | 11/2000 |
| JP | 2000-310301 A | 11/2000 |
| WO | WO 2005/050060 A1 | 6/2005 |
| WO | WO 2006/074707 A1 | 7/2006 |

OTHER PUBLICATIONS

Written Opinion of the International Searching Authority, Form PCT/ISA/237 mailed Aug. 1, 2008.

* cited by examiner

Fig. 6

| Fig. 2 / Fig. 1 / Fig. 3 | | B1 | K1 | K2° / K2 | K3 / K3° | K4 | simple shifting possible to gear |
|---|---|---|---|---|---|---|---|
| Gear | R | ■ | | ■ | | ■ | NR, 1, 2, 4, 5, 7, 8 |
| | NR | | | ■ | | ■ | N1, N2, R, 4, 5, |
| | N1 | | ■ | | | ■ | NR, N2, 1, 3, 5 |
| | N2 | | | | ■ | ■ | NR, N1, 2, 3, 4 |
| | 1 | ■ | ■ | | | ■ | N1, R, 2, 3, 5, 7 |
| | 2 | ■ | | | ■ | ■ | N2, R, 1, 3, 4, 8 |
| | 3 | | ■ | | ■ | ■ | N1, N2, 1, 2, 4, 5, 6 |
| | 4 | | | ■ | ■ | ■ | NR, N2, R, 2, 3, 5, 6, 8 |
| | 5 | | ■ | ■ | | ■ | NR, N1, R, 1, 3, 4, 6, 7 |
| | 6 | | ■ | | ■ | | 3, 4, 7, 8 |
| | 7 | ■ | ■ | | | | R, 1, 5, 6, 8 |
| | 8 | ■ | | ■ | | | R, 2, 4, 6, 7 |

| | | | | | | |
|---|---|---|---|---|---|---|
| i01 | -1,818 | | -1,600 | | -1,600 | |
| i02 | -2,784 | | -2,954 | | -3,323 | |
| i03 | -2,784 | | -2,954 | | -3,323 | |
| i36 | -2,662 | | -2,560 | | -2,804 | |
| i47 | -0,689 | | -0,633 | | -0,576 | |
| i58 | -1,193 | | -1,246 | | -1,282 | |
| Gear | -iG | φ | -iG | φ | -iG | φ |
| R | -3,000 | | -3,007 | | -3,575 | |
| 1 | 4,514 | 1,55 | 4,925 | 1,63 | 5,54 | 1,63 |
| 2 | 2,912 | 1,45 | 3,031 | 1,50 | 3,409 | 1,55 |
| 3 | 2,008 | 1,22 | 2,021 | 1,21 | 2,200 | 1,25 |
| 4 | 1,645 | 1,29 | 1,666 | 1,28 | 1,765 | 1,31 |
| 5 | 1,277 | 1,28 | 1,304 | 1,30 | 1,352 | 1,35 |
| 6 | 1,000 | 1,21 | 1,016 | 1,25 | 1,000 | 1,25 |
| 7 | 0,825 | 1,28 | 0,800 | 1,3 | 0,800 | 1,30 |
| 8 | 0,645 | | 0,616 | | 0,616 | |
| φges | 7,0 | | 8,0 | | 9,0 | |

Fig. 7

| version according Fig. 10 | |
|---|---|
| i01 | -1,755 |
| i02 | -1,755 |
| i03 | -3,364 |
| i36 | -2,182 |
| i47 | -0,808 |
| i58 | -0,882 |
| i2Diff | -3,842 |

| gear | -iG | φ | B1 | K1 | K2°° | K3 | K4° |
|---|---|---|---|---|---|---|---|
| R | -2,434 | | ■ | | ■ | | ■ |
| 1 | 3,850 | | ■ | ■ | | | ■ |
| 2 | 2,453 | 1,57 | ■ | | | ■ | ■ |
| 3 | 1,631 | 1,50 | | ■ | | ■ | ■ |
| 4 | 1,343 | 1,21 | | ■ | ■ | | ■ |
| 5 | 1,068 | 1,26 | | ■ | ■ | ■ | |
| 6 | 0,854 | 1,25 | | ■ | ■ | ■ | |
| 7 | 0,701 | 1,22 | ■ | ■ | ■ | | |
| 8 | 0,544 | 1,29 | ■ | | ■ | ■ | |
| φges | 7,08 | | | | | | |

Fig. 11

| version according Fig. 12 ||||||||
|---|---|---|---|---|---|---|---|
| i01 | -1,613 |||||||
| i02 | -2,406 |||||||
| i03 | -3,700 |||||||
| i36 | -2,295 |||||||
| i47 | -0,801 |||||||
| i58 | -0,957 |||||||
| i2Diff | -3,287 | | shifting logic |||||
| gear | -iG | φ | B1 | K1 | K2°° | K3 ||
| R | -3,905 | | ■ | | ■ | ||
| 1 | 4,500 | 1,62 | ■ | ■ | | ||
| 2 | 2,778 | 1,57 | ■ | | | ■ ||
| 3 | 1,769 | 1,22 | | ■ | | ■ ||
| 4 | 1,450 | 1,29 | | | ■ | ■ ||
| 5 | 1,124 | | | ■ | ■ | ||
| φ_ges | 4,00 |||||||

Fig. 13

POWERSHIFTABLE MULTISTAGE TRANSMISSION

CROSS REFERENCE TO RELATED APPLICATIONS

This application is a continuation of international patent application no. PCT/DE2008/000481, filed Mar. 19, 2008 designating the United States of America, and published in German on Oct. 2, 2008 as WO 2008/116449, the entire disclosure of which is incorporated herein by reference. Priority is claimed based on Federal Republic of Germany patent application no. DE 10 2007 014 150.7, filed Mar. 23, 2007.

BACKGROUND OF THE INVENTION

The invention relates to a powershiftable multistage transmission operating between an input shaft, which can be connected to a first shaft of the transmission, and an output shaft as a second shaft of the transmission, comprising two shaft-lines which are arranged in parallel in one transmission housing, three transfer gears, three planetary gears and several shifting elements, said first shaft-line having the first shaft as well as a third shaft, a fourth shaft and a fifth shaft and said second shaft-line having the second shaft as well as a sixth shaft, a seventh shaft and an eighth shaft, whereat the third shaft and the sixth shaft are connected by a first transfer gear and the fourth shaft and the seventh shaft are connected by a second transfer gear and the fifth shaft and the eighth shaft are connected by a third transfer gear and whereat a first planetary gear is arranged on the first shaft-line and has a first sun gear a first ring gear and a first planet-carrier, whereat a second planetary gear is arranged on the first shaft-line or on the second shaft-line and has a second sun gear a second ring gear and a second planet-carrier, whereat a third planetary gear is arranged on the second shaft-line and has a third sun gear a third ring gear and a third planet-carrier.

The Japanese paper JP 2000-304110 A describes such a powershiftable multistage transmission. In the various concepts of the transmission according to this state of the art the second planetary gear is arranged on the second shaft-line. For the shifting of up to six forward speeds and one reverse speed this transmission has five shifting elements, three clutches and two brakes. With these shifting elements certain gear elements can be linked together or to the transmission housing to get a definite kinematic situation and power-paths for a torque transmission with a certain ratio. A disadvantage of this transmission is that with this number of shifting elements only six forward speeds can be switched. But for further reduced fuel consumption and for even better driving dynamics vehicles need more and tighter stepped gears.

US patent application publication no. US 2006/0142111 A1 (=DE 10 2005 018 804) also describes powershiftable multistage transmissions which have two shaft-lines which are connected by three transfer gears. Most of the transmissions according to this state of the art have three planetary gears each with a sun gear a ring gear and a planet-carrier. But mostly two of the planetary gears are arranged on the first shaft-line. Also in these transmission concepts only six forward gears can be realized with only five shifting elements. For seven or eight forward speeds at least six shifting elements are necessary.

PCT international application no. WO 2006/074707 (=DE 10 2005 002 337) describes powershiftable multistage transmissions in which only five shifting elements are enough for eight well stepped forward gears and one reverse gear. It is a special feature and an advantage of these concepts, that in each gear always three of the five shifting elements have to be closed. That means that only two of five shifting elements are sliding and creating some sliding losses in each gear. In all variants according to this paper the gear sets of the transmission are four planetary gear sets, which are arranged coaxially on only one shaft-line. Each of the planetary gear sets has only three elements (sun, carrier, ring). This coaxial arrangement of four planetary gears is the reason why such a transmission becomes long and not very well suitable for front-cross-applications. Furthermore the coaxial arrangement of the planetary gear sets on only one shaft-line leads to the disadvantage, that at some points of the transmission up to five shafts are running within each other. That makes the arrangement of bearings complex. Furthermore in some versions of the transmission relatively long hollow shafts are necessary to connect elements over long distances. Furthermore it is a disadvantage, that in no transmission, described in this paper, all clutches can be fed with oil from the housing only through one oil transmitter between parts with relative speed. The oil supply of at least one clutch has to be done through two of such oil-transmitters, which means through an additional shaft.

In the above mentioned patent application there is a favorable stepping of the ratios of the eight forward speeds mentioned with $\phi_{ges}=7.05$ and a direct speed in the sixth gear. The analysis of this transmission shows, that the stationary ratios of the planetary gear sets to achieve this ratio stepping can be designed properly. But to achieve much different ratio steppings the stationary ratios have to become too big or too small, so that the transmission design will become difficult.

To reduce the fuel consumption more and more electric motors and electric accumulators will be integrated into future drivelines. By means of such devices an energy management allows to let the internal combustion engine to operate more efficient or to switch off the internal combustion engine whenever it is not necessary to let it run. By means of boosting, purely electrical driving and regenerative braking it is possible to get further potentials to save energy. The best position to link an electric motor to a driveline is somewhere in the transmission, because by such an optimal linkage the ratios of the transmission can reduce the loads on the electric system in most of the operating points. In most cases then a small electric motor is sufficient to get big benefits.

In this context it is claimed in WO 2006/074707 that an electric motor can be linked to each shaft of the transmission. But there are only those shafts suitable for a link to an electric motor which can be also linked directly to the transmission housing. But in the transmission structures, described in this state of the art, an electric motor can not be linked to the most suitable shaft.

All powershiftable multistage transmission concepts according to the state of the art with two shaft-lines, three transfer gears and three planetary gears can only shift six forward speeds and one reverse speed with only five shifting elements. To get up to eight forward speeds with only five shifting elements only concepts with four planetary gears which are coaxially arranged on one shaft-line are known.

SUMMARY OF THE INVENTION

Therefore it is an object of the invention to provide an improved powershiftable multistage transmission between an input shaft and an output shaft.

A further object of the invention is to provide a powershiftable multistage transmission comprising a plurality of gear sets, namely three transfer gears and three planetary gears, and a plurality of shifting elements with which the power-shiftings of an as large as possible number of forward speeds and at least one reverse speed is achieved with as few as possible shifting elements and which has a small total space requirement and achieves a high efficiency.

Another object is to provide a powershiftable multistage transmission with a short overall length by splitting up the gear structure on a plurality of shaft-lines.

A still further object of the invention is to provide a powershiftable multistage transmission which is suitable for standard inline applications and for use in multi-axle driven vehicles.

It is also an object of the invention to provide a powershiftable multistage transmission with a new gear-structure which is adaptable to different series of ratios and ratio steppings.

Yet another object of the invention is to provide a powershiftable multistage transmission with which it is possible to link an electric motor to the most suitable shaft for adapting the transmission to different ratios and ratio steppings.

These and other objects of the invention are achieved according to a first aspect of the invention by providing a powershiftable multistage transmission having a gear-structure of the type described above in which the first shaft is connected to the first planet-carrier, the second shaft is connected to the third planet-carrier, the fourth shaft is connected to the first ring gear or to the second planet-carrier, and the eighth shaft is connected to the third sun gear.

In accordance with an advantageous embodiment of the invention, the first sun gear is connectable to the transmission housing, the third shaft is connectable to the first sun gear, the fifth shaft is connectable to the first planet-carrier, and the sixth shaft is connectable to the third ring gear.

With these specifications the basic structure of the new transmission according to the invention is completely defined. However, this basic structure can be augmented in further detail in illustrative preferred embodiments.

In accordance with one advantageous embodiment, some structures having the second planetary gear on the second shaft-line are initially described. In this case the second shaft is connectable to the second planet-carrier, the fourth shaft is connectable to the fifth shaft, the seventh shaft is connectable to the second sun gear, the seventh shaft is connectable to the eighth shaft, and the eighth shaft is connectable to the second ring gear.

If two elements of the transmission are described herein as being linked together or connected, this means that these elements are linked in a constant kinematic relation. This can be achieved either by a direct mechanical link or by a transfer gear with a constant ratio. In contrast thereto, the term "connectable" means that two gear or elements can be joined firmly with each other or separated from each other, or that by means of a shifting element both options are possible.

A gear structure with eight shafts has a degree of freedom of eight. A planetary gear with three shafts has a degree of freedom of two because of its kinematic relation or its stationary ratio between its three gear elements. By use of three such planetary gears in addition to the eight shafts, the degree of freedom increases to 14. If there is one speed given, for example the input speed or the output speed, thirteen further connections between gear elements have to be defined to get a clear kinematic situation. Three of these further connections come form the three transfer gears because each of them links two shafts with a constant ratio. That means 10 connections are still to be defined. Four of these connections are defined by the basic structure of the invention as fixed connections between the first shaft and the first planet-carrier, the second shaft with the third planet-carrier, the fourth shaft with the first ring gear or with the second planet-carrier and the eighth shaft with the third sun gear. Then six further connections still need to be defined in each gear.

In accordance with the features of the first preferred embodiment, four further possible connections between gear elements are defined which may be used additionally in combination with the connections already defined by the basic structure.

In accordance with the features of a second preferred embodiment, five further possible connections between two gear elements are added for those gear structures with the second planetary gear on the second shaft-line.

It is an important advantage of a gear-structure with the arrangement of the gear elements on two shaft-lines that this leads to many more possible connections than in an inline-structure. This establishes more possible combinations of different connections for more gears which can be shifted with fewer shifting elements.

In a specifically preferred version of the transmission of the invention, out of nine defined optional connections in each gear six have to be used to achieve a degree of freedom of one. Therefore five of these connections will be taken for the implementation of shifting elements, but only three of them will be closed in each gear. And therefore three further connections have to be selected as fixed connections.

In accordance with a third preferred embodiment, in a first exemplary structure layout the transmission has five shifting elements, namely, a first brake which can connect the first sun gear to the transmission housing, a first clutch which can connect the fifth shaft to the first planet-carrier, a second clutch which can connect the seventh shaft to the second sun gear, a third clutch which can connect the fourth shaft to the fifth shaft, and a fourth clutch which can connect the sixth shaft to the third ring gear. In addition, the second shaft is connected to the second planet-carrier, the third shaft is connected to the first sun gear, and the eighth shaft is connected to the second ring gear.

Of the eight possible connections in this embodiment, five are shiftable and three are fixed. But as mentioned before only six of them are necessary to define a gear. That means that two of the five shifting elements are open. If only three of five shifting elements are closed in each gear, theoretically there are ten combinations of three from five possible. In this transmission concept nine of these combinations are used for eight forward speeds and one reverse speed. In a slightly different illustrative preferred embodiment structure-layout, the transmission again has five shifting elements, namely, a first brake which can connect the first sun gear to the transmission housing, a first clutch which can connect the fifth shaft to the first planet-carrier, an alternative second clutch which can connect the second shaft to the second planet-carrier, a third clutch which can connect the fourth shaft to the fifth shaft, and a fourth clutch which can connect the sixth shaft to the third ring gear, and additionally, the third shaft is connected to the first sun gear, the seventh shaft is connected to the second sun gear, and the eighth shaft is connected to the second ring gear.

In the transmission according to the second preferred embodiment, the second shaft is firmly connected to the second planet-carrier and the second clutch can link the seventh shaft to the second sun gear. In the transmission according to the third preferred embodiment, the alternative second clutch can link the second shaft to the second planet carrier. But then the connection between the seventh shaft and the second sun gear is fixed. Shifting elements shift power paths through a gear-structure. For the total ratio of a gear it is insignificant, at which point a power-path is defined by a closed shifting element. Therefore the shifting elements can be arranged in that way at certain positions that they can be actuated easily and that they have low loads if they are closed and low relative speeds if they are open.

With the arrangement of the shifting elements in the power-paths it is also possible to select to a certain extent the gear elements which shall be used in a specific gear. As an example of this, the structure-layout for the transmission according to a fourth preferred embodiment again has five shifting elements, namely, a first brake which can connect the first sun gear to the transmission housing, a first clutch which can connect the fifth shaft to the first planet-carrier, a second clutch which can connect the seventh shaft to the second sun gear, an alternative third clutch which can connect the seventh shaft to the eighth shaft, and a fourth clutch which can connect the sixth shaft to the third ring gear, and in addition the third shaft is connected to the first sun gear, the second shaft is connected to the second planet-carrier, and the eighth shaft is connected to the second ring gear.

In the gear-structures according to the second preferred embodiment and the third preferred embodiment, a third clutch can link the fourth shaft and the fifth shaft. In the gear-structure according to the fourth preferred embodiment, the alternative third clutch can link the seventh shaft and the eighth shaft. If the ratios of the transfer gears between the fourth shaft and the seventh shaft as well as between the fifth shaft and the eighth shaft differ, then these gear structures will have some different ratio steppings.

Another alternative structure-layout for the transmission is defined in a fifth preferred embodiment in which the transmission again has five shifting elements, namely, a first brake which can connect the first sun gear to the transmission housing, a first clutch which can connect the fifth shaft to the first planet-carrier, another alternative second clutch which can connect the eighth shaft to the second ring gear, a third clutch which can connect the fourth shaft to the fifth shaft, and a fourth clutch which can connect the sixth shaft to the third ring gear, and in addition, the third shaft is connected to the first sun gear, the second shaft is connected to the second planet-carrier, and the seventh shaft is connected to the second sun gear.

In all previously described layouts of gear-structures the fourth clutch can connect the sixth shaft to the third ring gear. Because in this layout the sixth shaft is connected to the third shaft by the first transfer gear, and the third shaft is connected to the first sun gear, the fourth clutch closes or opens a power-path from the first sun gear to the third ring gear. According to a sixth preferred embodiment, this power path can also be shifted by an alternative forth clutch which is located between the third shaft and the first sun gear. But then according to this sixth preferred embodiment, the sixth shaft is firmly connected to the third ring gear, so that no further shifting element is necessary.

Of course further shifting elements can be implemented in the gear structures, which are described so far, to get more kinematic connections for more gears. One example of this is represented by a seventh preferred embodiment in that in the gear-structure according to the third preferred embodiment, an additional second brake can connect the second planet-carrier to the transmission housing. With this additional brake the transmissions get another reverse gear. This can be advantageous in some applications.

According to a preferred aspect of the invention, the first shaft extends through the entire first shaft-line and both ends of the first shaft can be linked directly to the housing. If this is the case, a combustion engine or an electric motor can be linked to both ends. This arrangement leads to a large number of different application layouts for this transmission.

According to another preferred aspect of the invention, the second shaft extends through the entire second shaft-line and both ends of the second shaft can also be linked directly to the housing. If this is the case, output flanges or an electric motor can be linked to both ends. This arrangement also leads to a large number of different application layouts for the transmission.

The invention is not limited to the specific arrangements described above. Combinations of individual features and combinations of features with features from other embodiments described elsewhere in the specification and/or figures are possible and are considered to be within the scope of the invention.

The invention also includes arrangements which are technical equivalents according to the state of the art. The transmission of the invention comprises the input-sided first shaft-line and the output-sided second shaft-line. Both shaft-lines are linked via several power-paths to which the three transfer gears belong. If such power-paths are disconnected by clutches, this could also be done somewhere else within the power path with the same technical effect. If such power paths are linked to the transmission housing by a brake, such a brake can act somewhere else on this power path with the same function. From the state of the art it is also known that identical stationary ratios can be achieved with different structures of planetary gear sets. Such solutions are to be considered equivalent in the sense of this invention.

BRIEF DESCRIPTION OF THE DRAWINGS

The invention will be described in further detail hereinafter with reference to the accompanying drawing figures which depict illustrative examples of embodiments of the powershiftable multistage transmission of the invention. The illustrated gear-structures are described with respect to the arrangement of the transmission elements, the shifting logic and other functions. In the drawings:

FIG. 6 depicts a shifting logic for the gear-structures of FIGS. 3, 4 and 5;

FIG. 7 shows exemplary ratios and ratio steppings of the powershiftable multistage transmissions according to the invention;

FIG. 11 depicts the shifting logic and a preferable ratio stepping for the powershiftable multistage transmission of FIG. 10;

FIG. 13 depicts the shifting logic and a preferred ratio stepping for the powershiftable multistage transmission of FIG. 12.

DETAILED DESCRIPTION OF PREFERRED EMBODIMENTS

Figure 1:
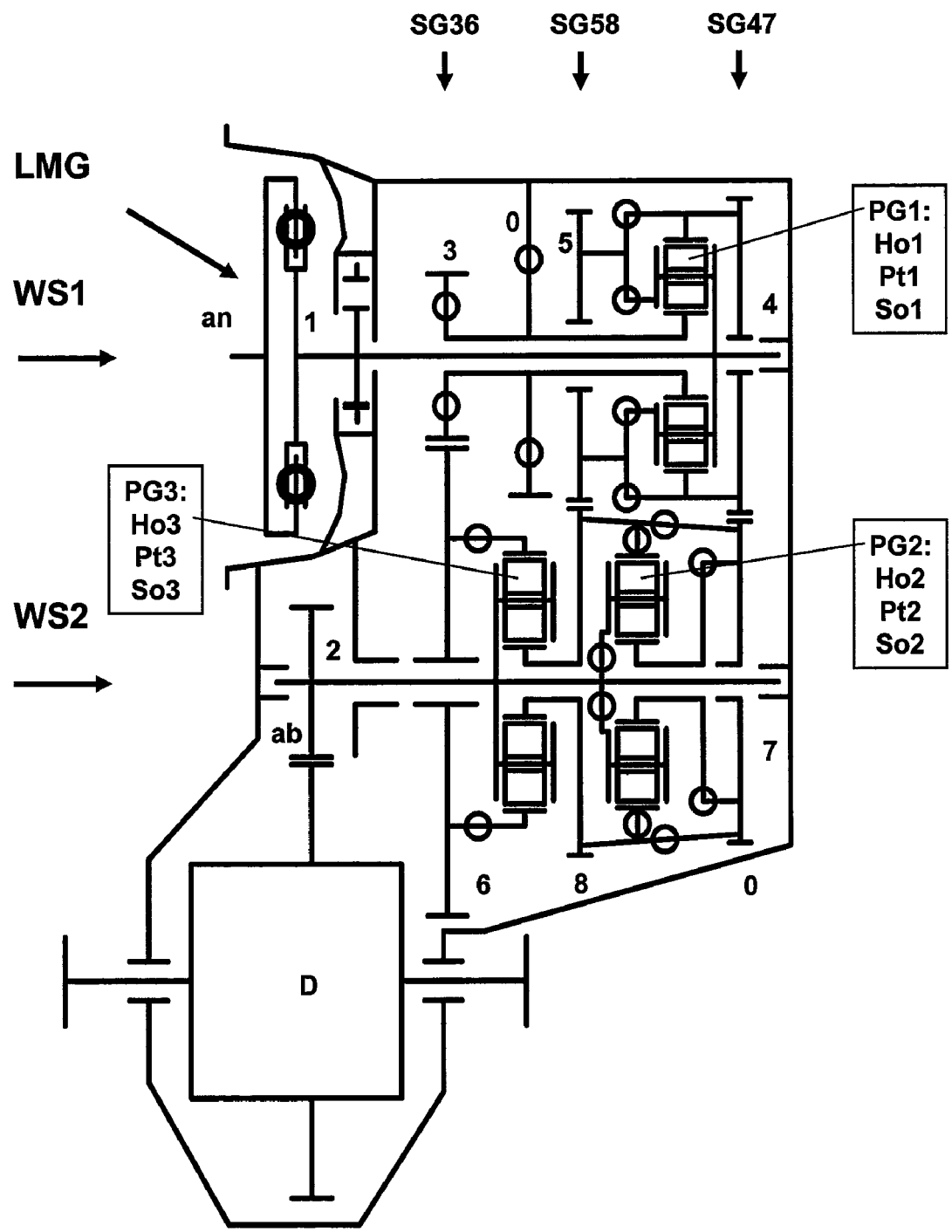
FIG. 1 shows a first basic gear-structure of the powershiftable multistage transmission of the invention with the second planetary gear on the second shaft-line.

FIG. 1 shows a basic structure of the powershiftable multistage transmission LMG according to the invention. The input shaft an is connected through a torsional vibration damper to the first shaft 1 of the first shaft-line WS1. In parallel to this first shaft-line a second shaft-line WS2 is arranged. Among other elements this shaft-line WS2 contains the output shaft ab which is described as shaft 2. In a here shown front-cross application, the output shaft drives the differential D of the front axle via another gear set.

Besides the first shaft 1, the first shaft-line WS1 also comprises a third shaft 3, a fourth shaft 4 and a fifth shaft 5. Besides the second shaft 2, the second shaft-line WS2 also comprises a sixth shaft 6, a seventh shaft 7 and a eighth shaft 8.

Both shaft-lines WS1 and WS2 are connected through three transfer gears (SG36, SG47 and SG58). The first transfer gear SG36 connects the third shaft 3 with the sixth shaft 6. The second transfer gear SG47 connects the fourth shaft 4 with the seventh shaft 7. The third transfer gear SG58 connects the fifth shaft 5 with the eighth shaft 8.

On the first shaft-line WS1 there is a first three-shaft planetary gear PG1. In a preferred embodiment, this planetary gear has a first sun gear So1, a first ring gear Ho1 and a first planet-carrier Pt1. On the second shaft-line WS2 there are a second three-shaft planetary gear PG2 and a third three-shaft planetary gear PG3. In a preferred embodiment, the second planetary gear PG2 has a second sun gear So2, a second ring gear Ho2 and a second planet-carrier Pt2. The third planetary gear PG3 has a third sun gear So3, a third ring gear Ho3 and a third planet-carrier Pt3 which is connected to the second shaft 2.

In the gear-structure shown in FIG. 1, besides the three transfer gears, there are four further fixed connections between gear elements. The first shaft 1 is connected to the first planet-carrier Pt1. The second shaft 2 is connected to the third planet-carrier Pt3. The fourth shaft 4 is connected to the first ring gear Ho1. The eighth shaft 8 is connected to the third sun gear So3.

Furthermore in this gear-structure nine further connections between two gear elements can be generated. In FIG. 1 these connections are marked with a circle. Specifically, these nine connections comprise connections between (1) the first sun gear So1 and the transmission housing 0, (2) the third shaft 3 and the first sun gear So1, (3) the fifth shaft 5 and the first planet-carrier Pt1, and (4) the sixth shaft 6 and the third ring gear Ho3, as well as between (5) the second shaft 2 and the second planet-carrier Pt2, (6) the fourth shaft 4 and the fifth shaft 5, (7) the seventh shaft 7 and the second sun gear So2, (8) the seventh shaft 7 and the eighth shaft 8, and (9) the eighth shaft 8 and the second ring gear Ho2.

Figure 2:
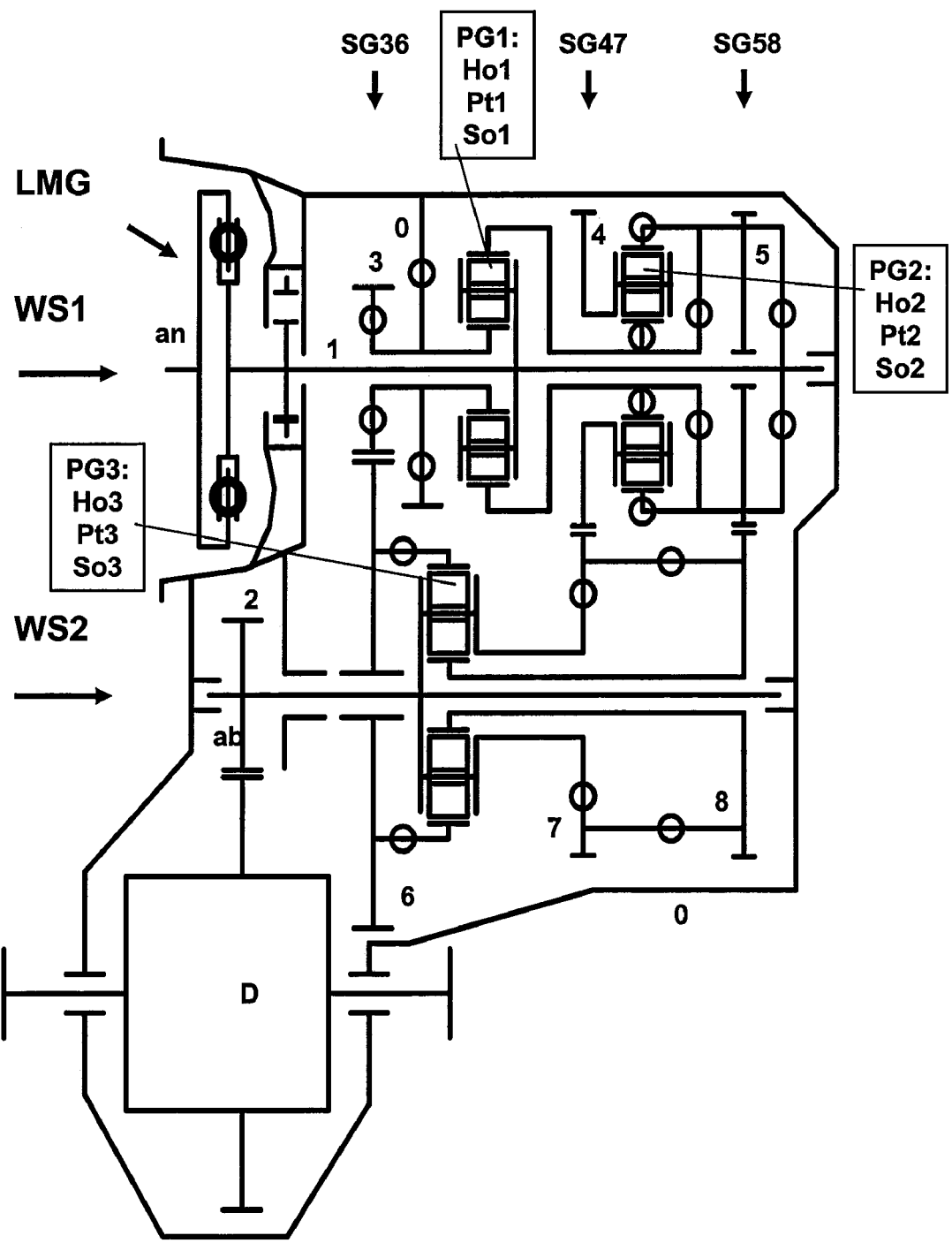
FIG. 2 shows a further basic gear-structure of the powershiftable multistage transmission of the invention with the second planetary gear on the first shaft-line.

FIG. 2 shows another basic structure of the powershiftable multistage transmission LMG according to the invention. Again the input shaft an is connected to the first shaft 1 of the first shaft-line WS1 via a torsional vibration damper. The parallel arranged second shaft-line WS2 again contains the output shaft ab which is described as shaft 2.

Again the first shaft-line WS1 comprises the first shaft 1, the third shaft 3, the fourth shaft 4 and the fifth shaft 5. The second shaft-line WS2 again comprises the second shaft 2, the sixth shaft 6, the seventh shaft 7 and the eighth shaft 8. Both shaft-lines WS1 and WS2 are again connected through the three transfer gears SG36, SG47 and SG58.

On the first shaft-line WS1, in addition to the first three-shaft planetary PG1, there is also the second three-shaft planetary gear PG2. On the second shaft-line WS2 there is only the third three-shaft planetary gear PG3.

In the gear-structure shown in FIG. 2, in addition to the three transfer gears, there are four further fixed connections between gear elements. The first shaft 1 is connected to the first planet-carrier Pt1. The second shaft 2 is connected to the third planet-carrier Pt3. The fourth shaft 4 is connected to the second planet-carrier Pt2. And the eighth shaft 8 is connected to the third sun gear So3.

Again in this gear-structure nine further connections between two gear elements can be generated at the same time or alternatively. Also In FIG. 2 these connections are marked with a circle. Specifically these include connections between (1) the first sun gear So1 and the transmission housing 0, (2) the third shaft 3 and the first sun gear So1, (3) the fifth shaft 5 and the first planet-carrier Pt1, and (4) the sixth shaft 6 and the third ring gear Ho3, as well as between (5) the second shaft 2 and the seventh shaft 7, (6) the fifth shaft 5 and the second ring gear Ho2, (7) the fifth shaft 5 and the first ring gear Ho1, (8) the first ring gear Ho1 and the second sun gear So2, and (9) the seventh shaft 7 and the eighth shaft 8.

Figure 3:
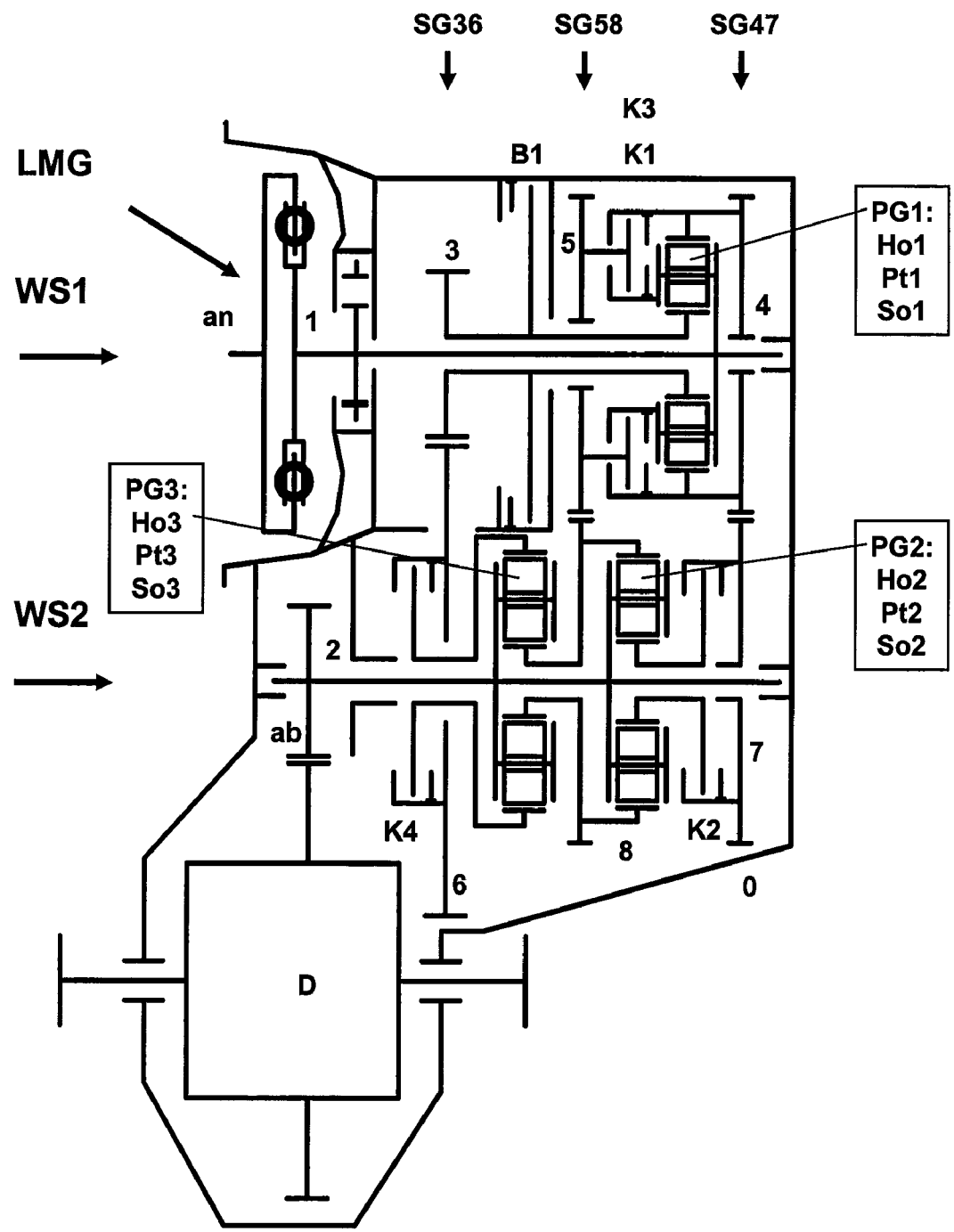
FIG. 3 shows the structure of a first version of the powershiftable multistage transmission according to the present invention.

FIG. 3 shows the structure of a first version of the powershiftable multistage transmission LMG according to the invention. The basic structure of this transmission with two planetary gears on the second shaft-line WS2 corresponds to that shown in FIG. 1. In this case the connections with a fixed kinematic ratio include: the first shaft 1 with first planet-carrier Pt1, the second shaft 2 with third planet-carrier Pt3, the fourth shaft 4 with first ring gear Ho1, and the eighth shaft 8 with third sun gear So3.

Of the nine further possible connections of the basic structure according to FIG. 1, in the following versions of the transmission five are always chosen for shiftable connections and three more are chosen for connections with fixed kinematics. The five shiftable connections include: (1) a first brake B1 can connect the first sun gear So1 to the transmission housing 0; (2) a first clutch K1 can connect the fifth shaft 5 with the first planet-carrier Pt1; (3) a second clutch K2 can connect the seventh shaft 7 with the second sun gear So2; (4) a third clutch K3 can connect the fourth shaft 4 to the fifth shaft 5, and (5) a fourth clutch K4 can connect the sixth shaft 6 to the third ring gear Ho3. In the specific embodiment the three additional fixed connections are: the second shaft 2 being connected with the second planet carrier Pt2; the third shaft 3 being connected with the first sun gear So1, and the eighth shaft 8 being connected with the second ring gear Ho2.

In each gear three of the five shifting elements are closed. Together with the other kinematic linkages they define how the power-flow in the first shaft-line is split to the three power-paths through the transfer gears by the operations of all three planetary gears and how the power-flow is summed up again to the total power on the second shaft-line. In the case of the embodiment of FIG. 3, it is important to note that on all power-paths the power flows from the first shaft-line WS1 to the second shaft-line WS2. In none of the gears does a backward power flow or a circulating power-flow occur. That is important to achieve low loads on all elements and a high efficiency.

Figure 4:
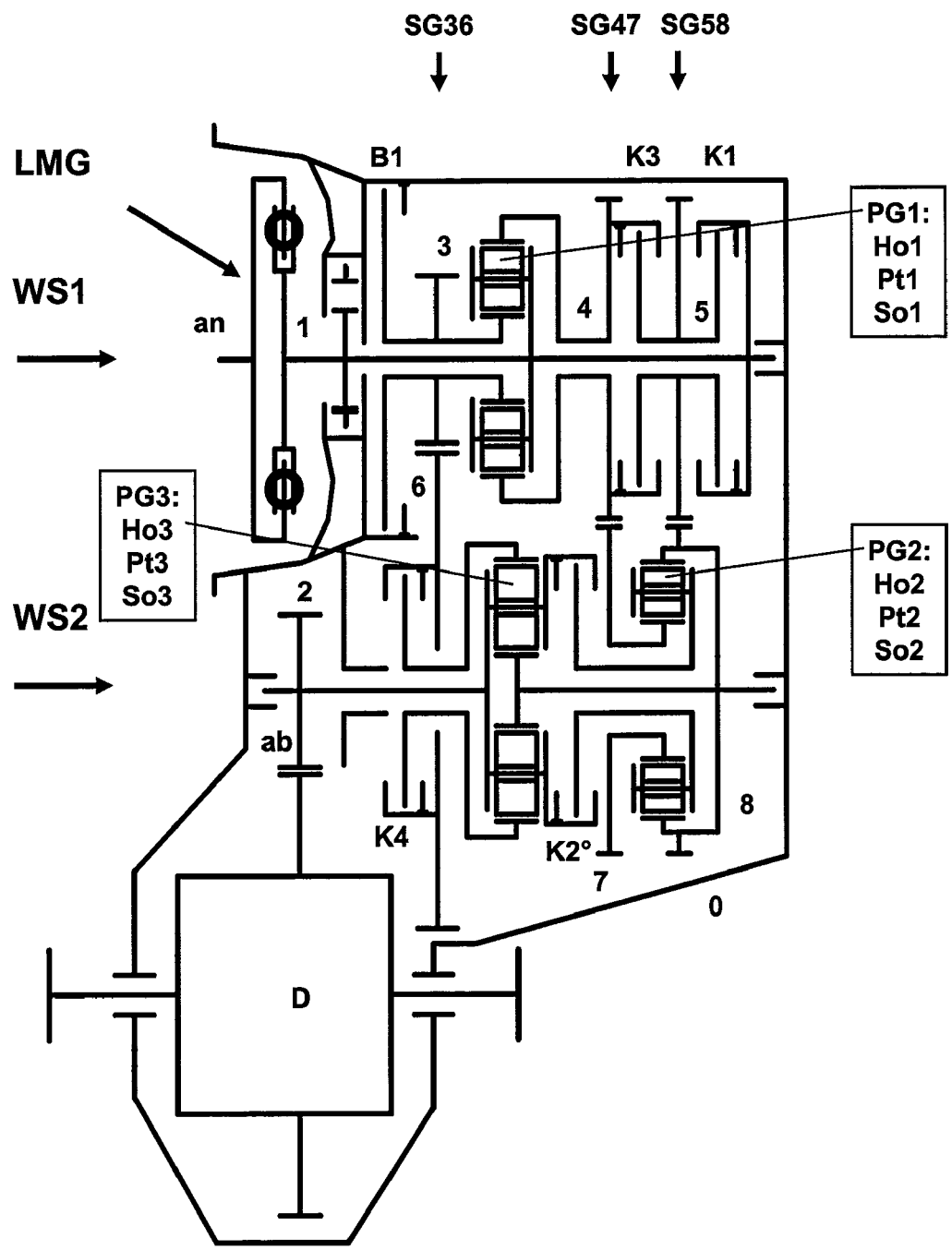
FIG. 4 shows the structure of a second version of the powershiftable multistage transmission according to the present invention.

Like the transmission according to FIG. 3 the powershiftable multistage transmission according to FIG. 4 has two shaft-lines, three planetary gears and three transfer gears. Again the transmission has five shifting elements. The connections with a fixed kinematic ratio again include: the first shaft 1 being connected with the first planet-carrier Pt1; the second shaft 2 being connected with the third planet-carrier Pt3; the fourth shaft 4 being connected with the first ring gear Ho1, and the eighth shaft 8 being connected with the third sun gear So3. In addition, in this embodiment the third shaft 3 is connected with the first sun gear So1; the seventh shaft 7 is connected with the second sun gear So2, and the eighth shaft 8 is connected with the second ring gear Ho2.

For the five shiftable connections in this embodiment: (1) a first brake B1 can connect the first sun gear So1 to the transmission housing 0; (2) a first clutch K1 can connect the fifth shaft 5 with the first planet-carrier Pt1; (3) an alternative second clutch K2° can connect the second shaft 2 with the second planet-carrier Pt2; (4) a third clutch K3 can connect the fourth shaft 4 to the fifth shaft 5; and (5) a fourth clutch K4 can connect the sixth shaft 6 to the third ring gear Ho3.

With the same ratios in the transfer gears and the planetary gears, the gear-structures according to FIGS. 3 and 4 have the same total ratios in the eight forward speeds and the one reverse speed. The shiftable connection between the second planetary gear PG2 and the shafts seven 7, eight 8 and two 2 in FIG. 3 results from a shifting element in the connection between the seventh shaft 7 to the second sun gear So2. In FIG. 4, the shiftable connection results from a shifting element in the connection between the second shaft 2 and the second planet-carrier Pt2. In each case the other connections to the gears of the second planetary gear are fixed.

Furthermore in the embodiment of FIG. 4 all shifting elements are accessible from outside, so that they also could be activated by electro-mechanical actuators. Such an embodiment would reduce the demand for auxiliary energy for the shift actuators and thereby further increase the efficiency of the transmission.

The powershiftable multistage transmission according to FIG. 5 again has a structure very similar to that of the powershiftable multistage transmission according to FIG. 3. Instead of the third clutch K3, this structure has an alternative third clutch K3° with which the seventh shaft 7 can be connected to the eighth shaft 8. If the ratios of the transfer gears SG47 and SG58 are different, this leads to a different ratio stepping in comparison to the version with the third clutch K3.

FIG. 6 depicts a shifting logic which 6 shows how one reverse speed and eight forward speeds can be shifted with these shifting elements in the specific embodiments of the transmission according to the present invention. In each driving speed three of the five shifting elements are closed. That means that in that operating state relative motions, which create some losses due to dragging torques, occur in only two actually unloaded shifting elements. In the neutral shift-positions, only two clutches are closed. As long as the first brake B1 is open, a distinct kinematics is not defined. By closing the first brake B1 the vehicle can be launched from the shift-position neutral-reverse NR into the reverse gear. In the same way the vehicle can be launched from the shift-position neutral_1 N1 into the first forward speed or from the shift position neutral_2 N2 into the second forward speed. During such a launch process the shifting elements which are used have to withstand a lot of frictional power and consequent heating. Because heat can be more easily dissipated to the housing from brakes than from clutches, the use of brakes as launching elements has some advantages.

The powershiftable multistage transmission of the invention can also be used in combination with an additional starting device like a starting clutch or a hydrodynamic torque converter. This will be explained further hereinafter.

The shifting logic according to FIG. 6 also makes it clear that in this powershiftable multistage transmission each gear-shift from one speed to the next or to the one after the next is possible with so-called simple shiftings. A simple shifting means that for the gear-shift only one shifting element has to be opened and one has to be closed. Some far gear-leaps are also possible with simple shiftings; for example the gear-leaps 5-1, 7-1, 6-3, 8-4. Such shiftings can be necessary especially at fast shiftings to the underdrive. Therefore in this powershiftable multistage transmission shiftings which need two shifting elements to be opened and two others to be closed are only necessary in exceptional cases. Simple shiftings can be controlled faster and more precisely than other shiftings.

Figure 5:
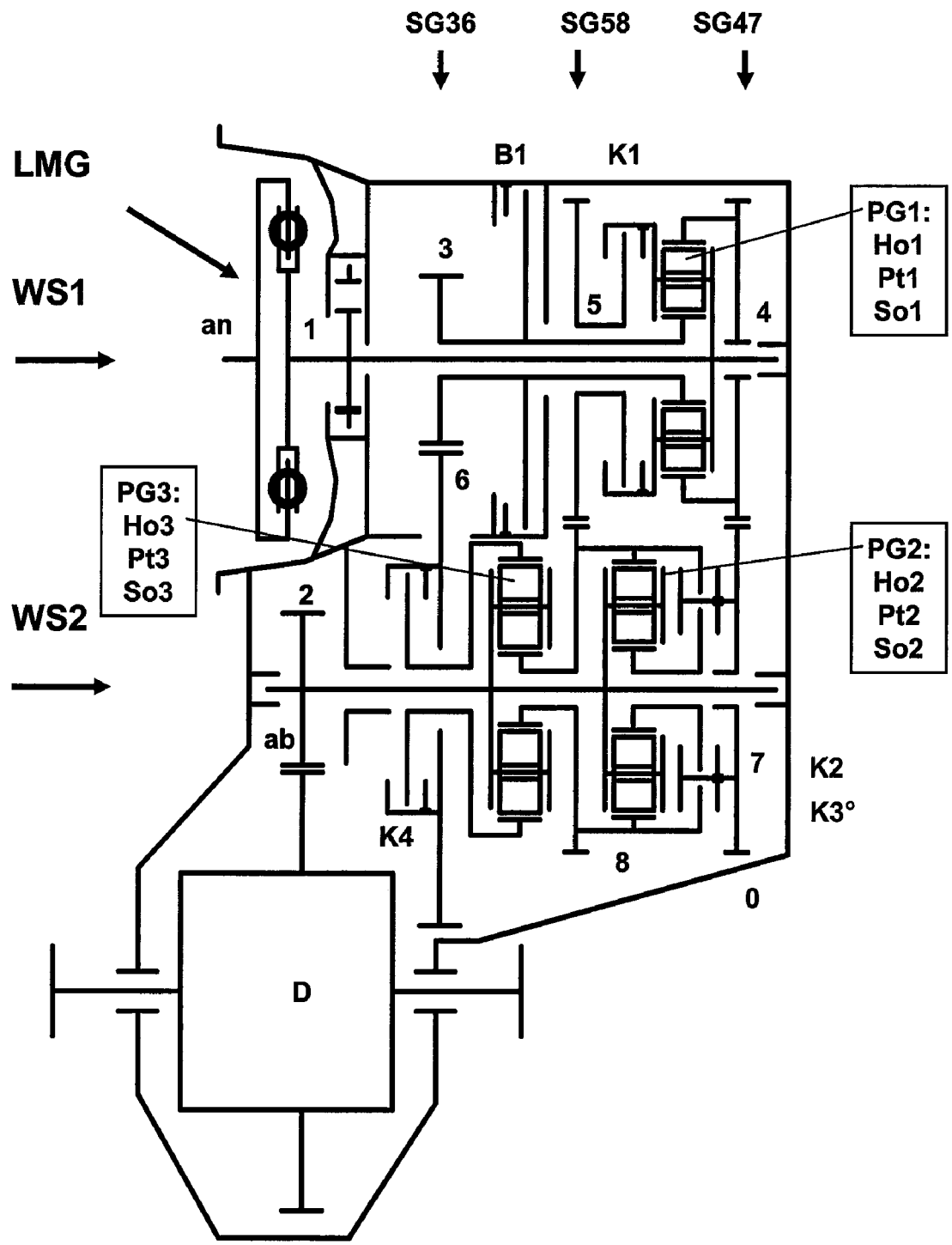
FIG. 5 shows the structure of a third version of the powershiftable multistage transmission according to the present invention.

By using additional shifting elements in the powershiftable multistage transmissions according to FIGS. 3 to 5 some further speeds become shiftable. For example the gear layout according to FIG. 4 can be modified by adding a second brake with which the second planet-carrier Pt2 can be linked to the transmission housing 0. In this way a further reverse gear can be realized. Further brakes for further shift-possibilities are conceivable on the shafts 4 or 7, 5 or 8, at the third ring gear Ho3, the second sun gear So2 or at the second ring gear Ho2. Further clutches between certain gear elements are likewise possible, for example between two shafts of one of the planetary gears PG2 and PG3, to enable these planetary gears rotate as a block and to extend the shifting logic to nine or more forward speeds with the same number of gear elements.

The table in FIG. 7 illustrates, in what wide range different ratio ranges can be achieved with these powershiftable multistage transmissions. Especially for the embodiment of FIG. 1 this table shows the stationary ratios of the planetary gears and the ratios of the transfer gears, as well as the total transmission ratios, their steppings and the total ratio ranges for eight forward speeds. For these examples the ratio of the sixth speed is around 1. The stationary ratios of the second and third planetary gears are the same. The absolute ratio of the reverse gear should have nearly the same value as the ratio of the second forward speed.

Based on this table, a person skilled in the art will recognize that the ratios of all six gear sets can be designed easily. A lot of different adaptations of this powershiftable multistage transmission are possible using the ratios of a total of six gear sets. It will be apparent to a person skilled in the art that other total ratios, bigger or smaller by the factor x, can easily be achieved if the ratios of all transfer gears are changed by the same factor x. Therefore those skilled in the art will know that nearly all ratio ranges which at present are required in applications for passenger cars can be achieved with the layout design according to FIG. 1.

The loads on all transmission elements at all speeds can be computed by a person skilled in the art based on the shifting logic and the ratios of all gear sets using techniques known in the art. Such an analysis results in the knowledge that, if the total power flows from the input an=1 to the output ab=2 in all speeds of all transmission versions according to this invention, then power never flows backwards from the second shaft-line WS2 to the first shaft-line WS1. In the reverse speed and in the first and second forward speed the power flows only through one transfer gear from the first shaft-line WS1 to the second shaft-line WS2. In all other speeds the power flows through two or three transfer gears. In the speeds which are used for a large share of time, the three transfer gears are as a whole subjected to relatively low loads. Therefore they can be designed small.

Figure 8:
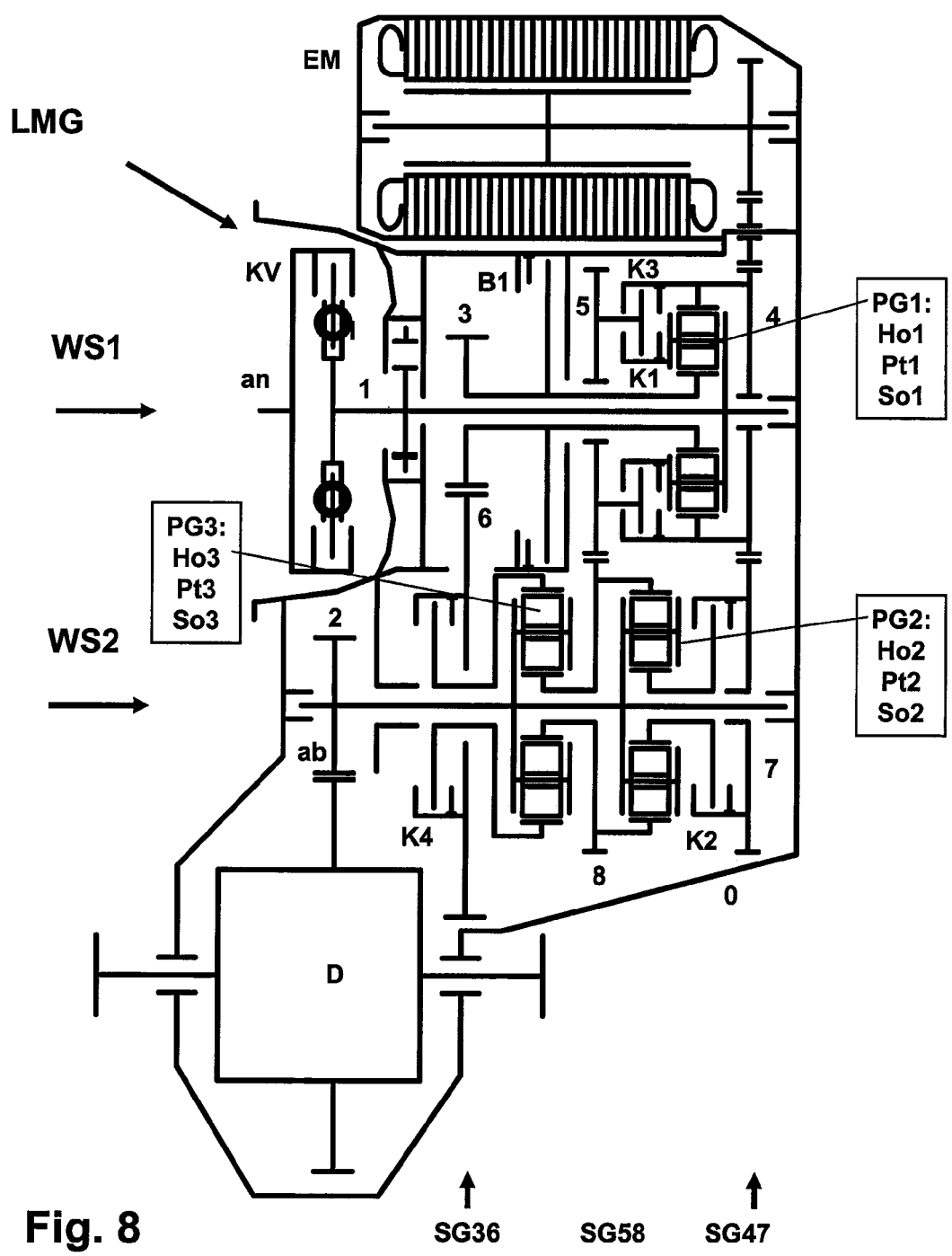
FIG. 8 shows the structure of a fourth version of the powershiftable multistage transmission of the invention with a preferred linkage of an electric motor.

FIG. 8 shows another version of the powershiftable multistage transmission of the invention according to FIG. 3, namely, a hybrid version. A small electric motor EM is linked to the fourth shaft 4 by an additional transfer gear. In this case the electric motor EM is arranged in parallel to both shaft-lines. But it is also possible to link the electric motor EM in a coaxial manner to shaft 4 or shaft 7.

The fourth shaft 4 and also the seventh shaft 7 are especially suitable for connection to an electric motor EM to achieve useful hybrid-functions. In the reverse speed and in the first and second forward speeds, the shafts 4 and 7 run faster than the input shaft. That means that they have high ratios towards the output shaft. If an electric motor is connected here, the vehicle can be driven and accelerated purely electrically. The combustion engine can be disconnected by an additional clutch KV. Because of the high ratios from the electric motor EM to the input shaft, only a small torque at the electric motor EM is necessary to accelerate and restart the combustion engine via clutch KV.

In the overdrive speeds the shafts 4 and 7 run faster than the input shaft an=1. Then even at low speeds of the combustion engine a small electric motor EM has a large available power because its speed is relatively high. Due to this there is a big potential to reduce fuel consumption by means of regenerative braking and boosting.

Figure 9:
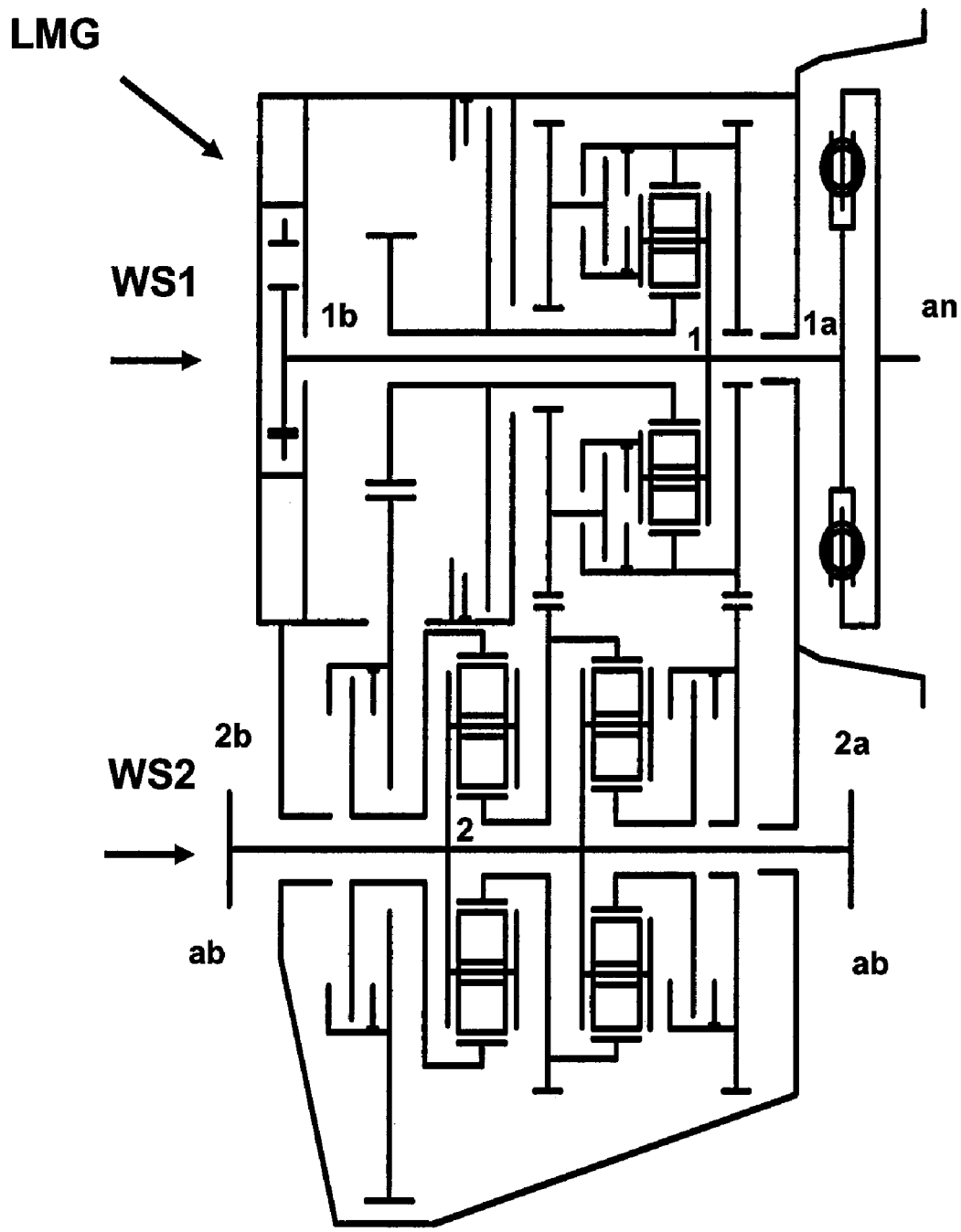
FIG. 9 shows the structure of a fifth version of the powershiftable multistage transmission of the invention with two output flanges.

In all versions of the powershiftable multistage transmission of the invention which have been discussed up to now, the first shaft 1 extends completely through the first shaft-line WS1. An internal combustion engine or an electric motor or a hydraulic pump or another auxiliary system could be connected at either or both of its end points 1$a$ and 1$b$ (see FIG. 9). In the same way, in the embodiments shown in FIGS. 1, 3 6 and 7, the output shaft ab=2 extends completely through the second shaft-line WS2. Further auxiliary systems also can be connected at its end-points 2$a$ and 2$b$. But the output shaft could also have two output-flanges, as shown in the embodiment according to FIG. 9. This could make sense, for example, for a vehicle with two driven axles. In this example also the damping system between the internal combustion engine and the transmission is located at the other end of the input shaft. The arrangement of two parallel shaft-lines and a first shaft 1, which extends through its shaft-line, as well as a second shaft 2, which extends through its shaft-line, allows this transmission concept to be adapted to a lot of possible applications.

Figure 10:
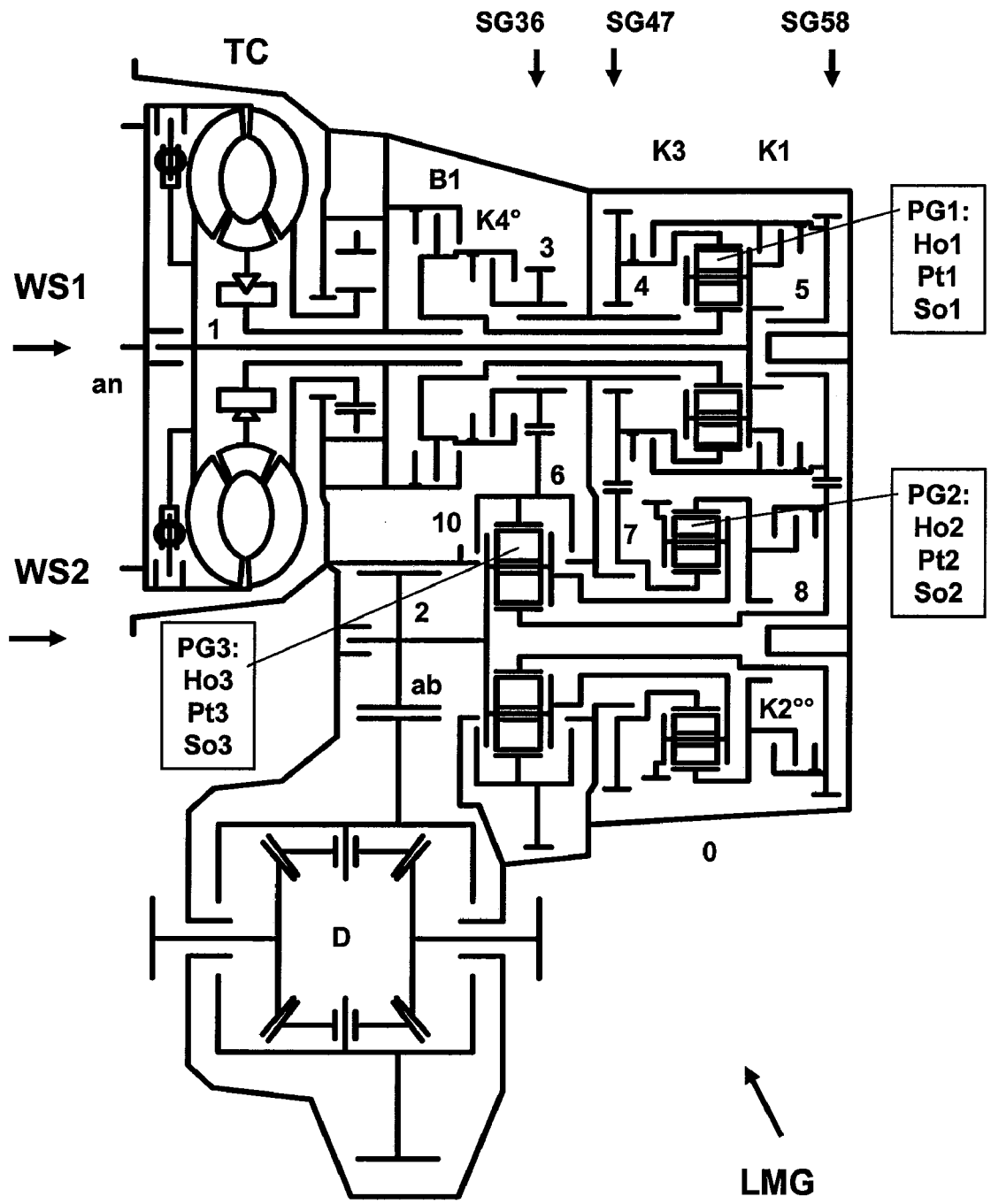
FIG. 10 shows the structure of a sixth version of the powershiftable multistage transmission of the invention with a torque converter and only five shifting elements for eight forward gears.

FIG. 10 shows another embodiment of the powershiftable multistage transmission of the invention with a classic hydrodynamic torque converter TC as a starting element between the input shaft an and the first shaft 1 of the transmission. Again the connections with fixed kinematic ratio are: (1) the first shaft 1 is connected with the first planet-carrier Pt1; (2) the second shaft 2 is connected with the third planet-carrier Pt3; (3) the fourth shaft 4 is connected with the first ring gear Ho1; and (4) the eighth shaft 8 with third sun gear So3. In addition, in this specific embodiment (5) the second shaft 2 is connected with the second planet-carrier Pt2; (6) the sixth shaft 6 is connected with the third ring gear Ho3, and (7) the seventh shaft 7 is connected with the second sun gear So2.

For the five shiftable connections (1) a first brake B1 can connect the first sun gear So1 to the transmission housing 0;
(2) a first clutch K1 can connect the fifth shaft 5 with the first planet-carrier Pt1; (3) another alternative second clutch K2°° can connect the eighth shaft 8 with the second ring gear Ho2; (4) a third clutch K3 can connect the fourth shaft 4 to the fifth shaft 5; and (5) an alternative fourth clutch K4° can connect the third shaft 3 to the first sun gear So1.

In the embodiment according to FIG. 3, the second clutch K2 is located in the connection between the second sun gear So2 and the seventh shaft 7. In the embodiment according to FIG. 4, the alternative second clutch K2° is located in the connection between the second planet carrier Pt2 and the second shaft 2. In the embodiment according to FIG. 10, the other alternative second clutch K2°° is located in the connection of the second ring gear Ho2 to the eighth shaft 8. These three solutions are equivalent according to the state of the art in that if such a clutch K2, K2° or K2°° is opened at one of the three elements of the second planetary gear PG2, no torque can be transmitted. According to the well known relations between torques in a planetary gear, then the other elements of this planetary gear also can not have a torque. That means it does not matter which element of this gear (So2, Ho2 or Pt2) is disengaged. In any case this planetary gear can not transmit power.

These three alternatives to integrate the second planetary gear PG2 into the power transmission only differ regarding the relative speeds in the second clutch K2, K2° or K2°°, if this shifting element is open, and in the maximum torque in the clutch if this planetary gear PG2 transmits torque. But the position of this shifting element has no influence on the total transmission ratio and on the power splitting on the certain power-paths. The shares of power in the power-paths and the total ratio only depend on the ratios of the gear sets and on the shifted power-paths.

The powershiftable multistage transmission of the invention according to FIG. 10 also has a third planetary gear PG3. The third ring gear Ho3 of this gear set is firmly connected to the sixth shaft 6, which is linked to the third shaft 3 by the first transfer gear PG36. In this embodiment of the transmission, this power-path is initially linked to the first sun gear So1 with the alternative fourth clutch K4°. Also in the transmission according to FIG. 3, this power-path extends from the first sun gear So1 through the third shaft 3, the first transfer gear SG36 and the sixth shaft 6 to the third ring gear Ho3. The fourth clutch K4, which in this embodiment is used to shift this power-path, is located between the sixth shaft 6 and the third ring gear Ho3. For the shifting logic and the stepping of its gears, it does not matter at which point a power-path is switched.

From the embodiments of the transmission according to FIGS. 3, 4 and 5, it is already known that in one shift-situation the first sun gear So1 can be connected to the transmission housing 0 by a first brake B1. In the transmission according to FIG. 10, this is done in the same way. In the embodiments according to FIGS. 3, 4 and 5, this shift-situation could also be achieved with the same effect regarding the total ratio, by a brake (not shown) that operates on the sixth shaft 6 to link the first sun gear So1 to the transmission housing 0, because the fourth clutch K4 operates only between the sixth shaft 6 and the third ring gear Ho3.

The table of FIG. 11 shows the ratios of the three planetary gears and the three transfer gears for an illustrative embodiment of the multistage transmission according to FIG. 10. With such a layout the transmission achieves a ratio range of a bit more then φ=7 between the eight forward speeds. The stationary ratios i01 and i02 for the first and the second planetary gear PG1 and PG2 are so small that their sun gears can become relatively large in order to extend further shafts through these sun gears. But the planet wheels do not become too small, because then their speeds relative to their planet-carrier would increase too much. The third planetary gear PG3 has a rather large stationary ratio i03. This leads to the result that the high output torques, which are needed for strong acceleration in the first gear, are first generated in this final output-sided gear set.

The ratios i47 and i58 of the second and the third transfer gear SG47 and SG58 deviate only a little from the value 1. That leads to relatively large and therefore lightly loaded gear elements whose bearings need less space. This is also helpful for a compact transmission design. The ratio i36 of the first transfer gear SG36 has to be relatively large. Within the limits required to achieve a good ratio stepping, this ratio was chosen to be as small as possible in order to get an as large as possible gear wheel on the third shaft 3, so that there is still enough space for a compact bearing arrangement.

Figure 12:
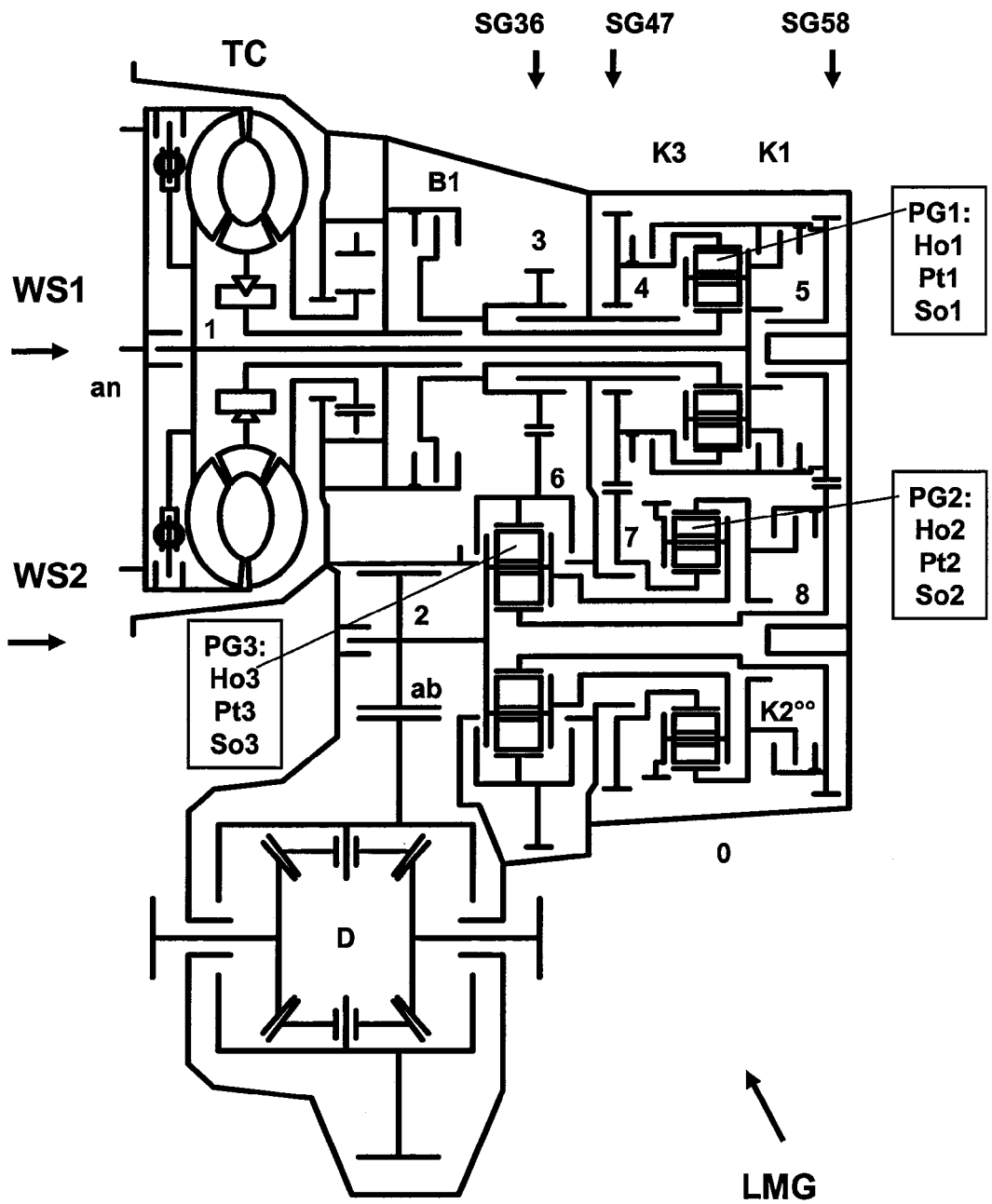
FIG. 12 shows the structure of a seventh version of the powershiftable multistage transmission of the invention with a torque converter and only four shifting elements for five forward gears.

From the shifting logic according to FIG. 10, it is notable that in reverse gear and in the first five forward gears the alternative fourth clutch K4° is always closed. Therefore, in a version of the transmission with only five forward speeds, this clutch can be eliminated. As shown in FIG. 12 therefore this clutch can be replaced by a fixed connection between the third shaft 3 and the first sun gear So1. Then the power-path from the first sun gear So1 to the third ring gear Ho3 is always active. In such an embodiment, the transmission has only four shifting elements for a total of six shift-combinations between one reverse gear and five forward gears. In each gear two of these shifting elements are closed and two are open.

The table in FIG. 13 shows a layout of the gear sets for a total ratio range of $\phi=4$ between the forward gears for such a transmission. For small, light and relatively low powered vehicles, a transmission with a ratio range of $\phi=4$ is fully adequate. With only four shifting elements and a smaller actuation device for only four shifting elements, a powershiftable multistage transmission according to FIG. 12 becomes so small and simple that it is suitable for use in small cars. This version of the powershiftable multistage transmission is especially suitable for vehicle applications in cities with high traffic density and limited top speed.

With an increasing traffic density and decreasing resources of raw materials, a low fuel consumption becomes more and more important. Hybrid drivelines facilitate better management of the energy that is necessary to drive a car, and they can help to save energy. But they require integration of an electric motor into the driveline.

In an automatic transmission with a hydrodynamic torque converter TC, it is possible to replace the hydrodynamic torque converter with an electric motor EM. Such a torque converter is a very comfortable starting device and is easy to control. But its function can be assumed by other frictional shifting elements, especially if an electric motor EM supports the driveline.

Figure 14:
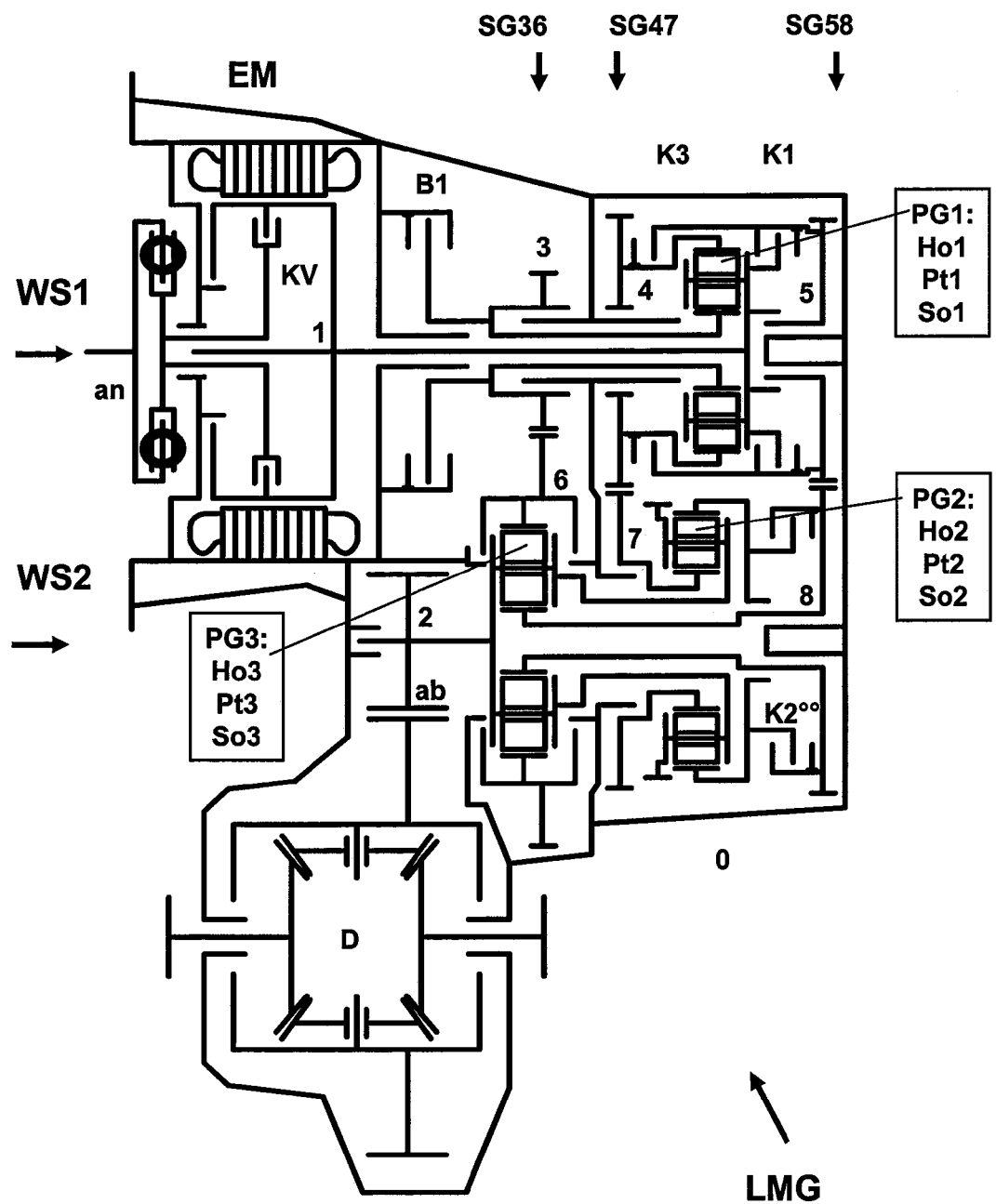
FIG. 14 shows a hybrid version of the powershiftable multistage transmission of FIG. 12 with an electric motor instead of the hydrodynamic torque converter and a further clutch.

For example, FIG. 14 shows a transmission according to FIG. 12 with an electric motor EM instead of the hydrodynamic torque converter TC. The space gained because of the elimination of the alternative fourth clutch K4° could be used for integrating further components for the hybrid drive, such as, for example, an electric drive oil pump.

To disengage the internal combustion engine from the driveline, this transmission again has an additional clutch KV. If clutch KV is open, only the electric motor EM drives the driveline. To start the combustion engine the clutch KV is closed. To the extent that torque flows through clutch KV to accelerate the internal combustion engine, the electric motor must supply more torque so that the torque at the output shaft ab=2 remains constant. Today control systems are available to achieve such procedures.

If the internal combustion engine is to be started when the vehicle is at a standstill, only clutch K1 (K2°°) of the multistage transmission may be closed if afterwards the car is to start driving forward (reverse). To launch the car then the first brake B1 will be closed in a controlled manner. Examples of this can be found in the state of the art.

Of course further gear sets and shifting elements can be used to reduce the loads on the electric motor. But the very simple solution which is shown in FIG. 14 needs only a small number of gear elements for a small and compact design.

All the gear-structures which are shown in the FIGS. 3, 4, 5, 8, 9, 10, 12 and 14 have one planetary gear PG1 on the input-sided first shaft-line WS1 and two planetary gears PG2 and PG3 on the output-sided second shaft-line WS2. Especially for the gear-structures according to FIGS. 10, 12 and 14, this leads to some advantages regarding the arrangement of the gear elements between a torque converter TC or an electric motor EM with a relatively big diameter and a differential D with also a relatively big diameter at its gear. However, the invention also expressly extends to embodiments with two planetary gear stages on the drive side first shaft-line WS1 and only one planetary gear stage on the driven side second shaft-line WS2. Such versions can be derived in an analogous manner from the basic structure of the transmission of the invention according to FIG. 2.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

The invention claimed is:

1. A powershiftable multistage transmission operating between an input shaft which can be connected to a first shaft of the transmission, and an output shaft as a second shaft of the transmission;

said transmission comprising two shaft-lines which are arranged in parallel in a transmission housing, first, second and third transfer gears, first, second and third planetary gears, and a plurality of shifting elements;

said first shaft-line comprising the first shaft and a third shaft, a fourth shaft and a fifth shaft, and said second shaft-line comprising the second shaft and a sixth shaft, a seventh shaft and an eighth shaft; wherein:

the third shaft and the sixth shaft are connected by the first transfer gear;

the fourth shaft and the seventh shaft are connected by the second transfer gear;

the fifth shaft and the eighth shaft are connected by the third transfer gear;

the first planetary gear is arranged on the first shaft-line and comprises a first sun gear, a first ring gear and a first planet-carrier;

the second planetary gear is arranged on the first shaft-line or on the second shaft-line and comprises a second sun gear, a second ring gear and a second planet-carrier;

the third planetary gear is arranged on the second shaft-line and comprises a third sun gear, a third ring gear and a third planet-carrier;

the first shaft is directly connected to the first planet-carrier;

the second shaft is connected to the third planet-carrier;

the fourth shaft is directly connected to the first ring gear or to the second planet-carrier; and the eighth shaft is connected to the third sun gear.

2. The powershiftable multistage transmission according to claim 1, wherein:

the first sun gear is connectable to the transmission housing;

the third shaft is connectable to the first sun gear;

the fifth shaft is connectable to the first planet-carrier; and the sixth shaft is connectable to the third ring gear.

3. The powershiftable multistage transmission according to claim 2, wherein the first shaft extends through the entire first shaft-line, and both ends of the first shaft can be linked to the transmission housing.

4. The powershiftable multistage transmission according to claim 2, wherein the second shaft extends through the entire second shaft-line, and both ends of the second shaft can be linked to the transmission housing.

5. The powershiftable multistage transmission according to claim 1, wherein:

the second planetary gear is arranged on the second shaft-line;

the second shaft is connectable to the second planet-carrier;

the fourth shaft is connectable to the fifth shaft;

the seventh shaft is connectable to the second sun gear;

the seventh shaft is connectable to the eighth shaft; and the eighth shaft is connectable to the second ring gear.

6. The powershiftable multistage transmission according to claim 1, wherein the plurality of shifting elements comprises the following five shifting elements:

a first brake which can connect the first sun gear to the transmission housing;

a first clutch which can connect the fifth shaft to the first planet-carrier;

a second clutch which can connect the seventh shaft to the second sun gear;

a third clutch which can connect the fourth shaft to the fifth shaft; and a fourth clutch which can connect the sixth shaft to the third ring gear; and wherein:

the second shaft is connected to the second planet-carrier;

the third shaft is connected to the first sun gear; and the eighth shaft is connected to the second ring gear.

7. The powershiftable multistage transmission according to claim 1, wherein the plurality of shifting elements comprises the following five shifting elements:

a first brake which can connect the first sun gear to the transmission housing;

a first clutch which can connect the fifth shaft to the first planet-carrier;

a second clutch which can connect the second shaft to the second planet-carrier;

a third clutch which can connect the fourth shaft to the fifth shaft; and a fourth clutch which can connect the sixth shaft to the third ring gear; and wherein:

the third shaft is connected to the first sun gear;

the seventh shaft is connected to the second sun gear; and the eighth shaft is connected to the second ring gear.

8. The powershiftable multistage transmission according to claim 7, wherein the plurality of shifting elements comprises a second brake which can connect the second planet-carrier to the transmission housing.

9. The powershiftable multistage transmission according to claim 1, wherein the plurality of shifting elements comprises the following five shifting elements:

a first brake which can connect the first sun gear to the transmission housing;

a first clutch which can connect the fifth shaft to the first planet-carrier;

a second clutch which can connect the seventh shaft to the second sun gear;

a third clutch which can connect the seventh shaft to the eighth shaft; and a fourth clutch which can connect the sixth shaft to the third ring gear; and wherein:

the third shaft is connected to the first sun gear;

the second shaft is connected to the second planet-carrier; and the eighth shaft is connected to the second ring gear.

10. The powershiftable multistage transmission according to claim 1, wherein the plurality of shifting elements comprises the following five shifting elements:

a first brake which can connect the first sun gear to the transmission housing;

a first clutch which can connect the fifth shaft to the first planet-carrier;

a second clutch which can connect the eighth shaft to the second ring gear;

a third clutch which can connect the fourth shaft to the fifth shaft; and a fourth clutch which can connect the sixth shaft to the third ring gear; and wherein:

the third shaft is connected to the first sun gear;

the second shaft is connected to the second planet-carrier; and the seventh shaft is connected to the second sun gear.

11. The powershiftable multistage transmission according to claim 1, wherein the plurality of shifting elements comprises the following five shifting elements:

a first brake which can connect the first sun gear to the transmission housing; a first clutch which can connect the fifth shaft to the first planet-carrier;

a second clutch which can connect the eighth shaft to the second ring gear;

a third clutch which can connect the fourth shaft to the fifth shaft; and a fourth clutch which can connect the third shaft to the first sun gear; and wherein:

the second shaft is connected to the second planet-carrier;

the sixth shaft is connected to the third ring gear; and the seventh shaft is connected to the second sun gear.

12. The powershiftable multistage transmission according to claim 1, wherein the plurality of shifting elements comprises a second brake which can connect the second planet-carrier to the transmission housing.

13. The powershiftable multistage transmission according to claim 1, wherein the first shaft extends through the entire first shaft-line, and both ends of the first shaft can be linked to the transmission housing.

14. The powershiftable multistage transmission according to claim 1, wherein the second shaft extends through the entire second shaft-line, and both ends of the second shaft can be linked to the transmission housing.

* * * * *